(12) United States Patent
Bronicki

(10) Patent No.: US 6,981,378 B2
(45) Date of Patent: Jan. 3, 2006

(54) METHOD OF AND APPARATUS FOR PRODUCING UNINTERRUPTIBLE POWER

(75) Inventor: Lucien Y. Bronicki, Yavne (IL)

(73) Assignee: Ormat Technologies Inc., Sparks, NV (US)

( * ) Notice: Subject to any disclaimer, the term of this patent is extended or adjusted under 35 U.S.C. 154(b) by 45 days.

(21) Appl. No.: 10/470,800

(22) PCT Filed: Feb. 11, 2002

(86) PCT No.: PCT/US02/21866

§ 371 (c)(1),
(2), (4) Date: Feb. 24, 2004

(87) PCT Pub. No.: WO02/093722

PCT Pub. Date: Nov. 21, 2002

(65) Prior Publication Data

US 2004/0128999 A1 Jul. 8, 2004

Related U.S. Application Data

(63) Continuation-in-part of application No. 09/917,812, filed on Jul. 31, 2001, now abandoned, which is a continuation-in-part of application No. 09/780,672, filed on Feb. 12, 2001, now Pat. No. 6,494,042.

(51) Int. Cl.
F01K 13/02 (2006.01)

(52) U.S. Cl. .............................. 60/646; 60/657; 60/651; 60/671

(58) Field of Classification Search .................. 60/646, 60/651, 657, 671

See application file for complete search history.

(56) References Cited

U.S. PATENT DOCUMENTS

| 4,235,077 | A | * | 11/1980 | Bryant | 60/618 |
| 4,558,228 | A | * | 12/1985 | Larjola | 290/52 |
| 6,192,687 | B1 | * | 2/2001 | Pinkerton et al. | 60/646 |

* cited by examiner

Primary Examiner—Hoang Nguyen
(74) Attorney, Agent, or Firm—Nath & Associates PLLC; Gary M. Nath; Jerald L. Meyer

(57) ABSTRACT

Uninterruptible power is supplied to a load connected to a power line by connecting the power line to a rotatable member that includes a Rankine cycle turbine coupled to a device that operates as a motor when line power is operative thereby rotating the member at a standby rotational speed so that a predetermined amount of kinetic energy is stored in the rotating member, and that operates as a generator when the line power is inoperative and the member is rotated by the application of vaporized working fluid to the turbine. Working fluid is vaporized and maintained at an operational temperature level only when the line power is inoperative. The working fluid is held at a standby temperature level, preferably greater than the operational temperature level, while the power line is operative whereby the working fluid contains a predetermined amount of stored thermal energy while the power line is operative. In response to loss of line power, vaporized working fluid is applied to the turbine thereby rotating the rotatable member whereby the turbine rotates the member at a nominal operational speed that preferably is less than the standby rotational speed. Finally, in response to the loss of line power the device is connected to the load whereby the stored thermal energy in the working fluid and the stored kinetic energy in the rotating member are converted by the device to power for the load.

6 Claims, 4 Drawing Sheets

FIG.1A (PHASE 0)
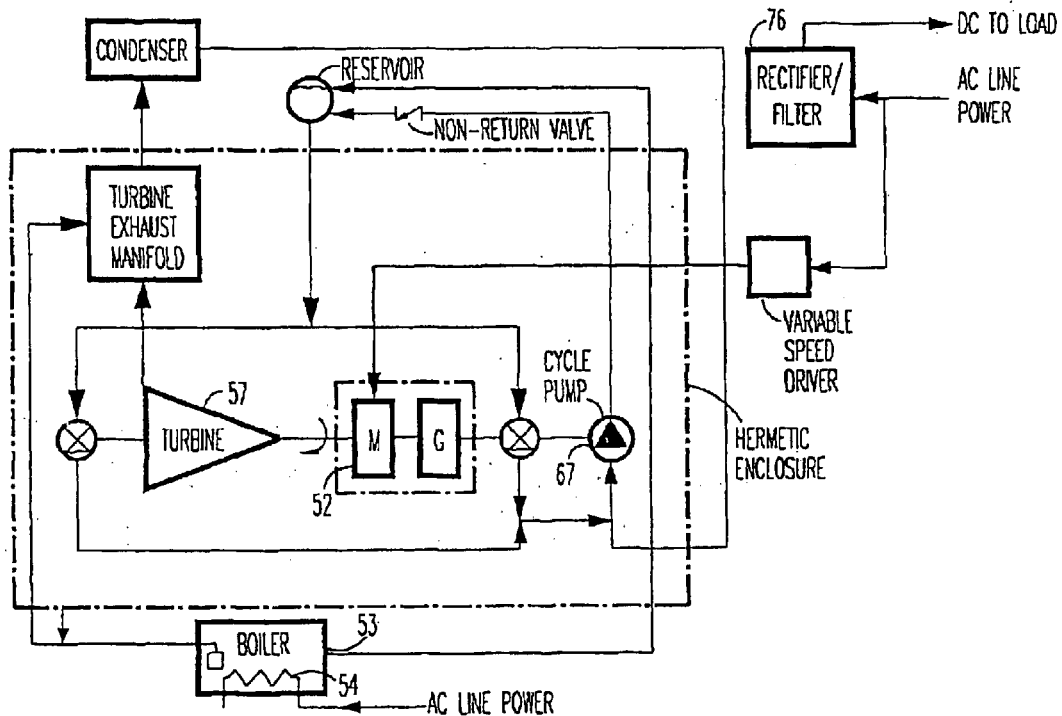
FIG.1B (PHASES 1A, 1B AND 1C)
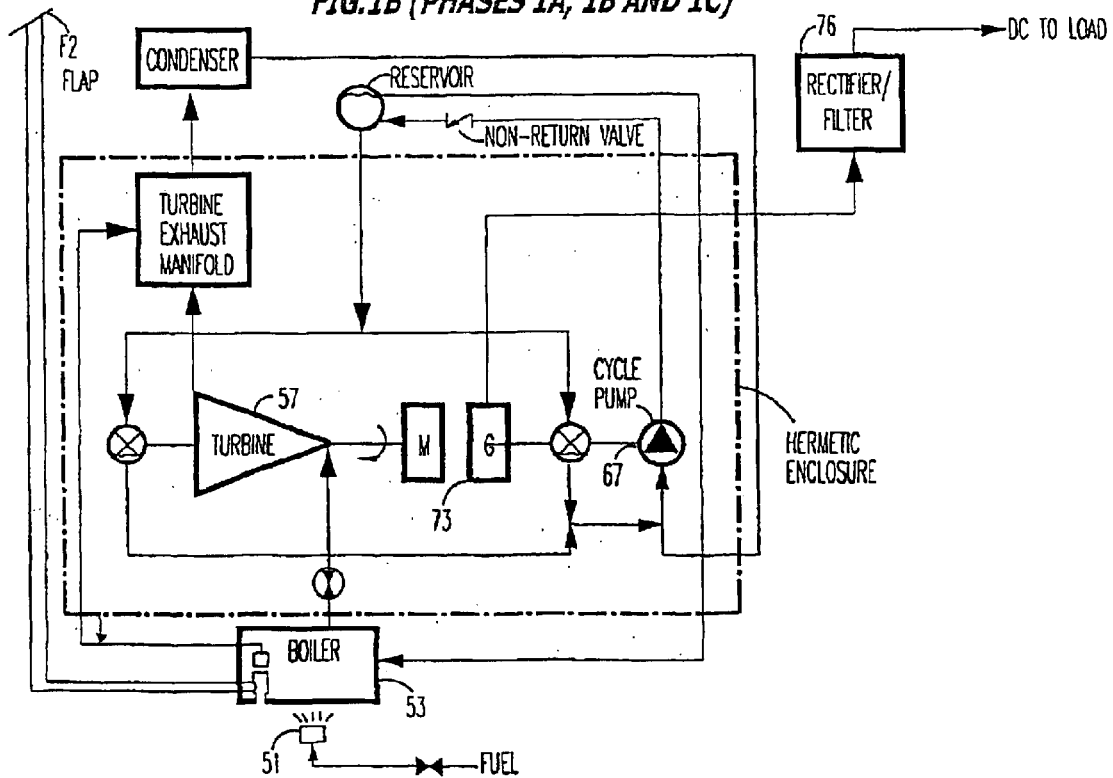

METHOD OF AND APPARATUS FOR PRODUCING UNINTERRUPTIBLE POWER

This application is a 371 of Ser. No. PCT/US02/21866, which is a continuation-in-part application of Ser. No. 09/917,812 filed on Jul. 31, 2001, abandoned, which is a continuation-in-part application of Ser. No. 09/780,672, filed on Feb. 12, 2001, now U.S. Pat. No. 6,494,042, the entire contents of which are hereby incorporated.

TECHNICAL FIELD

This invention relates to a method of and apparatus for producing power, and more particularly, to a method of and apparatus for producing uninterruptible power for communication systems that are located in urban areas or in the vicinity of towns and also stand alone power systems for communication installations in remote areas.

BACKGROUND OF THE INVENTION

Uninterruptible power systems particularly in communication systems often utilize photovoltaic systems, thermoelectric generators (TEG) or organic Rankine cycle energy converters. A diesel engine based uninterruptible power sources (UPS) utilizes batteries or a flywheel to supply an electrical load when line power drops out and until the diesel can start and bring the generator on line.

In telecommunications systems, redundant organic Rankine cycle energy converters each operating at partial load have been used so that, failure of one converter causes the other converter to supply the full load. A transient period, until which the second energy converter delivers the full load, which can last from a few minutes up to about 20–50 minutes can be reduced by a standard battery that delivers a few ampere-hours.

Since 1976, as part of the Trans-Alaska Pipeline Project, a large number of stations have been operating each using a single Organic Rankine cycle turbine unit as a warm standby unit to ensure the required reliability. In such a standby unit, a line-operated electric heater under themostatic control provides external heat to a vapor generator of the unit to maintain the working fluid at about 120° F. When power fails, the main burner is activated quickly bringing the organic vapor Rankine cycle turbine unit on line delivering full power to the station as described in Trans-Alaska Pipeline, Remote Gate Valve Equipment Buildings, Operation and Maintenance Manual, Volume II, Ormat Energy Converter Model 155, April 1976).

In a related system disclosed in U.S. Pat. No. 4,982,569, the disclosure of which is hereby incorporated by reference, a hybrid power system is disclosed that includes an intermittently operable non-fuel consuming power generator, such as a photovoltaic cell array, or a wind generator, connected through a control-circuit to a battery for changing the same and for supplying current to a time-wise, substantially constant, electrical load. In addition, this hybrid power plant includes an electric generator connected to an intermittently operable prime mover, such as a Rankine cycle organic vapor turbogenerator for charging the battery and supplying current to the electrical load when the prime mover is operated, and a sensor for sensing at least one electrical parameter of the power plant. With such an arrangement, the prime mover is operable only when the power generator is not operating.

In another related system disclosed in U.S. Pat. No. 4,760,705, the disclosure of which is hereby incorporated by reference, the invention disclosed therein relates to a Rankine cycle power plant operating with an improved working fluid, the working fluid being a compound selected from the group consisting of bicyclic aromatic hydrocarbons, substituted bicyclic aromatic hydrocarbons, heterocyclic aromatic hydrocarbons, substituted heterocyclic aromatic hydrocarbons, bicyclic or heterobicyclic compounds where one ring is aromatic and the other condensed ring in a non-aromatic, and their mixtures. In a further aspect of the invention disclosed in this U.S. patent, a binary Rankine cycle power plant is provided in which the condenser of the high temperature and pressure turbine is cooled by a different working fluid which is vaporized thereby and supplied to a low temperature and pressure turbine.

Israel Patent 43547 discloses a further related system and discloses a rotor for a homopolar electrical machine.

Batteries are used in all the telecommunication projects to provide DC power to the telecom equipment and the reliability and availability of the system depends strongly on the battery characteristics.

The batteries have a limited lifetime and if not properly charged and maintained they have to be replaced a few times during the life of a project estimated as 20–25 years.

In addition, because the battery condition cannot be correctly assessed, battery failure occurs without any kind of advance notice, station shut-down often occurs unexpectedly. Moreover, the battery fails when they are actually needed so that, when there is an electrical grid power outage, the diesel generator fails when it is attempted to start it consequently causes the battery, UPS and diesel generator not to provide power.

It is therefore an object of the present invention to provide a new and improved method of and apparatus for providing uninterruptible power wherein the disadvantages as outlined are reduced or substantially overcome.

SUMMARY OF THE INVENTION

According to the present invention, an uninterruptible power supply associated with a power line for supplying a load includes a load circuit connecting said power line to said load for powering the same while said power line is operative, and a rotatable member including a Rankine cycle turbine coupled to a device that operates as a generator when line power is inoperative and this member is rotated by the application of vaporized working fluid to the turbine. A driver circuit connects the power line to the device thereby rotating the rotatable member at a standby rotational speed while the power line is operative for storing a predetermined amount of kinetic energy in the rotating member. The power supply also includes a boiler containing working fluid, a burner associated with said boiler operable to produce vaporized working fluid and to maintain the same at an operational temperature level when the line power is inoperative, and resistance heater associated with the boiler and connected to the power line for holding the working fluid at a standby temperature level while the power lind is operative, the standby level of the boiler being preferably greater than the operational level of the boiler whereby the working fluid contains a predetermined amount of thermal energy while the power line is operative. A valve is operable to connect the boiler to the turbine for applying vaporized working fluid to the turbine thereby rotating the rotatable member, and a control is responsive to loss of line power (1) for operating the burner, which causes the boiler to produce vaporized working fluid, and for operating the valve, which supplies vaporized working fluid to the Rankine cycle turbine which thereby rotates the member at a nominal operational speed preferably that is less than the standby rotational speed, and (2) for connecting the device to the load whereby power is supplied to the load while the power line is inoperative, the thermal energy in the working fluid in the boiler and the predetermined amount of kinetic energy being converted by the device to power for the load upon loss of line power.

In addition, the present invention includes a method for supplying uninterruptible power to a load connected to a power line comprising connecting the power line to a rotatable member comprising a Rankine cycle turbine coupled to a device that preferably operates as a motor when line power is applied to the device thereby rotating the member at a standby rotational speed for storing a predetermined amount of kinetic energy in the rotating member, and that operates as a generator when the line power is inoperative, the member being rotated by the application of vaporized working fluid to the turbine. Additionally, the method includes vaporizing working fluid and maintaining the same at an operational temperature level only when the line power is inoperable. Furthermore, the method includes holding working fluid at a standby temperature level while the power line is operative, the standby temperature level preferably being greater than the operational temperature level whereby the working fluid contains a predetermined amount of stored thermal energy while power line is operative. In addition, the method includes applying the vaporized working fluid to the turbine thereby rotating the rotatable member in response to loss of line power whereby the turbine rotates the member at a nominal operational speed that is preferably less than the standby rotational speed. Moreover, the method includes connecting the device to the load whereby power is supplied to the load while the power line is inoperative so that the stored thermal energy in the working fluid and the predetermined amount of kinetic energy are converted to power for the load upon loss of line power.

BRIEF DESCRIPTION OF THE DRAWINGS

Embodiments of the present invention are described by way of example, and with reference to the accompanying drawings wherein:

FIGS. 1A–1B are schematic diagrams of an embodiment of the present invention showing different modes or phases of operation;

Like reference numerals and designations in the various drawings refer to like elements.

DETAILED DESCRIPTION

Figure 2:
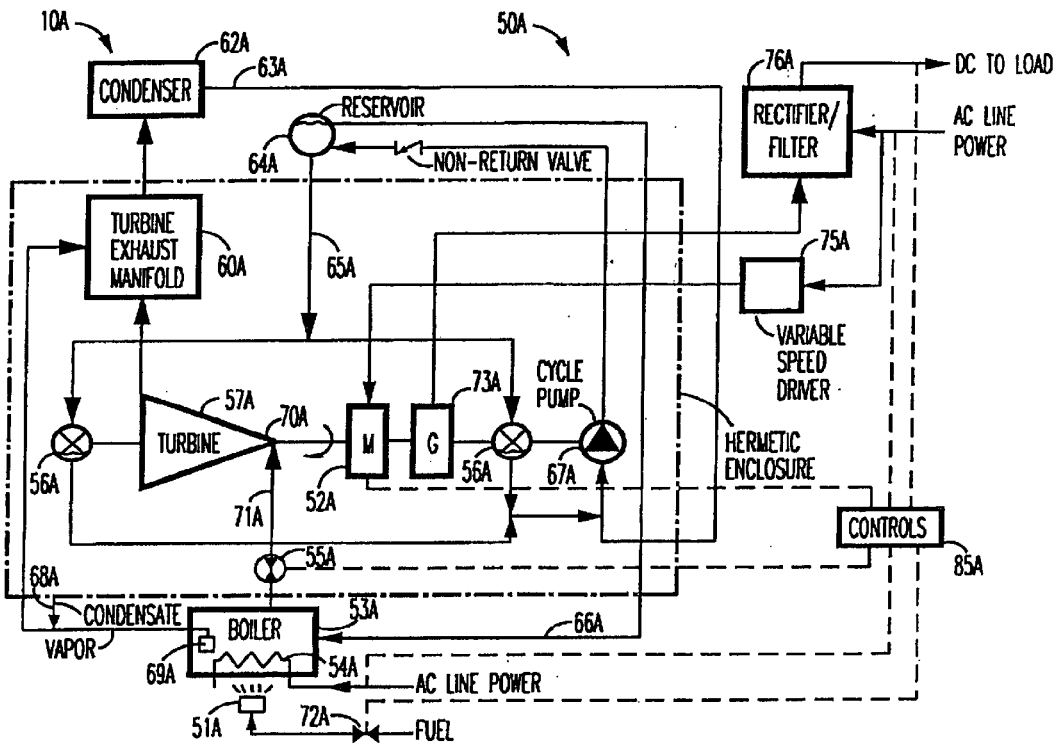
FIG. 2 is a schematic diagram of an embodiment of the present invention.

Turning to the Figures, FIGS. 1A and 1B show shematically the main phases of operation of the preferred embodiment of the present invention, the phases being designated as Phases 0, 1a, 1b and 1c and representing the configuration of the apparatus as a function of events that occur in the operation of the apparatus. Phase 0 occurs when an electric utility supplies line power to a load, this phase lasting as long as line power is operative. In Phase 0, the apparatus is in a hot standby rotational speed, and working fluid in boiler 53 is maintained at an operational temperature level by a resistance heater connected to the line.

Phase 1a occurs in response to the loss of line power, and typically last for a few seconds as spin-down of turbine 57 causes generator 73 to deliver energy to the load. Upon loss of power, working fluid is applied to turbine 57 and fuel is delivered to burner 51.

Phase 1b typically last for a few minutes after loss of line power occurs as stored thermal energy in boiler 53 is converted to electricity and delivered to the load. At the end of phase 1b, the burner is delivering sufficient heat to the boiler to maintain the same at an operational temperature level at which the turbine operation sustains the load. At this time, Phase 1c occurs as long as the line remains inoperative and the fuel is not exhausted.

In phase 0 (see FIG. 1A) power is supplied by the electric utility to the load by rectifier 76 as well as the AC input being supplied to motor 52 that maintains or drives turbine 57 so that it is rotated. In this phase, electric heater 54, supplied by AC line power supplied by the utility, preferably maintains the temperature of vapor generator or boiler 53 at a temperature above its normal operating temperature (normal operation or normal operating conditions being conditions during phase 1c described below). However, on the other hand, the temperature of boiler or vapor generator 53 can be maintained at the same temperature as that when normal operation takes place (see phase 3 described below). In addition, in phase 0, if preferred, motor 52 maintains the speed of turbine 57 above its normal operating speed (normal operation or normal operating conditions being conditions during phase 1c described below). However, on the other hand, the speed of turbine 57 can be maintained at its normal operating speed i.e. during normal operation (see phase 1c described below). In phase 1a (see FIG. 1B), a utility failure occurs so that no line power is available and the power is supplied to the load for a short period of time (e.g. some seconds) by Rankine cycle turbine 57 utlitizing its inertia or kinetic energy via generator 73 and rectifier 76. Thereafter, in phase 1b (see also FIG. 1B), power is supplied to the load by Rankine cycle turbine 57via generator 73 and rectifier 76 utlzing the thermal energy present in boiler or vapor generator 53. In phase 1c (see FIG. 1B as well), power is supplied by Rankine cycle turbine 57, under its normal operating conditions, to the load via generator 73 and rectifier 76 wherein boiler or vapor generator 53 now supplies the vapors to Rankine cycle turbine 57 from heat supplied from the combustion gases produced by burner 51.

Thus, the Rankine cycle turbine is maintained at hot standby conditions wherein the hot standby Rankine cycle turbine is the rotating Rankine cycle turbine 57 and boiler or vapor generator 53 is in a state of incipient rate flow of vaporized working fluid. In such a manner, the Rankine cycle turbine system, having the rotating Rankine cycle turbine 57 and hot boiler or vapor generator 53, in phase 0, is at hot standby ready to provide the required continuous operation to ensure that the load is continuously supplied with the required power.

As far as FIG. 2 is concerned, power unit system 10A is provided according to an embodiment of the present invention for providing uninterruptible power and includes organic Rankine cycle turbine 57A designed to operate as a hot standby organic Rankine cycle turbine system 50A. In the present embodiment, hot standby organic Rankine cycle turbine system 50A includes electric motor 52A for rotating the turbine when electric power is available from the electric grid. The embodiment also includes boiler 53A and heater 51A comprising e.g. a burner for combusting fuel. In addition, the present embodiment includes electric heater 54A for heating the liquid organic working fluid in the boiler when electric line power is available from the electric grid or utility. Moreover, in the present embodiment, valve 55A is included that enables the supply of organic working fluid vapor to turbine 57A for its nominal operation, when electric power is not available from the electric grid.

In operation, when the electric grid or utility is supplying electric line power, electric motor 52A rotates turbine 57A via driver 75A that receives power from the grid. Line 66A receives sufficient organic working fluid vapor from boiler 53A, heated by electric heater 54A, for supplying fluid only to bearings 56A. Heater, i.e. burner, 51A is not operated and preferably a flap located on the stack of boiler 53A is maintained in a closed state by an actuator. Thus, liquid supplied via line 66A is supplied to reservoir 64A. This condensate is supplied via line 65A where it is cooled to bearings 56A. Condensate exiting the bearings is supplied via pump 67A, e.g. a pitot pump, to reservoir 64A from where it is returned to bearings 56A. Electric heater 54A continues to supply heat to organic working fluid in boiler 53A for compensating for fluid finding its way back via line 68A to vessel 69A in heat relationship with boiler 53A. Thus, under such conditions, the electric grid supplies power to the load and the organic Rankine cycle turbine system is maintained at hot standby.

When the electric grid does not supply electric power, kinetic energy present in turbine 57A permits power unit 10A to continue to supply electric power even though no electric power is supplied to electric motor 52A from the electric grid or utility. Valve 55A is opened by control unit 85A, which senses the state of the line power, in order that organic working fluid vapor is supplied from boiler 53A via conduit 71A to turbine nozzle block 70A. Consequently, power is now produced by the rotation of organic Rankine cycle turbine 57A rotated by organic working fluid vapor produced by heat present in the hot organic working fluid present in boiler 53A. At the same time, the actuator opens the flap and heater, i.e. burner, 51A, commences operation with the receipt of a control signal from control unit 85A that also sends a control signal to open fuel valve 72A. In addition, control unit 85A sends a control signal to electric heater 54A to stop operation. The rotation of organic Rankine cycle turbine 57A results in generator 73A producing electric power that can be supplied to the load. Thus, now the heat produced by the combustion gases from burner 51A heats the working fluid in boiler 53A that produces vapors for supply to turbine 57A.

When electric power becomes available from the electric grid once again, control 85A senses the electric power and sends control signals to heater, i.e. burner, 51A, to switch off, to the flap to close, to electric heater 54A to switch on and to close valve 55A so that no organic working fluid vapor is supplied via this valve to organic Rankine cycle turbine 57A. Organic working fluid liquid continues to be supplied to bearings 56A of turbine 57A as previously described via line 66A, reservoir 64A and line 65A.

Thus, in accordance with the present invention and with reference to FIG. 2, in standby mode or Phase 0 (see FIG. 1A) when line or utility power is available to supply the load, turbine 57A is driven by motor 52A. Also in this mode, boiler 53A is heated by resistance or electric heater 54A receiving line power from the utility or electric grid. Working fluid liquid supplied to reservoir 64A is cooled in line 65A and is supplied to bearings 56A for providing lubrication of the bearings during rotation of turbine 57A.

In transient mode, phase 1a (see FIG. 1B), when utility failure occurs and line power is interrupted, kinetic energy present in turbine 57A permits the turbine to continue rotating so that generator 73A produces power that is supplied to the load via rectifier 76A. Also, at the same time, valve 55A begins to open so that organic working vapor can be supplied from boiler 53A via conduit 71A to turbine nozzle block 70A in order that vapors are supplied to turbine 57A for rotating it. In addition, simultaneously, ignition of burner 51A commences while electric heater 54A is switched off. Thereafter, in phase. 1b (see FIG. 1B), valve 55A having completed opening and continues to supply vapors to turbine 57A using heat present in boiler or vapor generator 53A, generator 73A produces power that is supplied to the load, fuel valve 72A opens and burner 51A commences operation. Consequently, boiler 53A quickly produces rated flow of vaporized working fluid.

Subsequently, when line power is unavailable, phase 1c (see FIG. 1B), in an active mode, boiler 53A, heated by the continuous operation of burner 51A, supplies rated flow of vaporized working fluid to turbine 57A that drives generator 73A for supplying power to the load.

Figure 3:
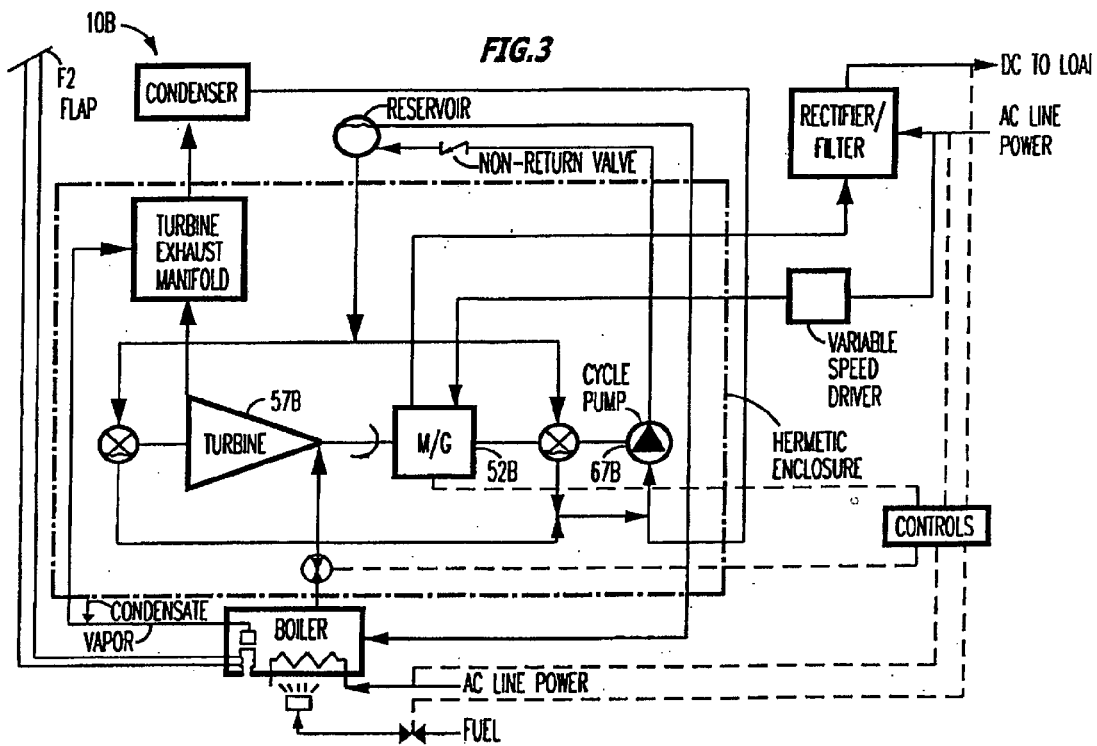
FIG. 3 is a schematic diagram of a modification of the embodiment of the present invention shown in FIG. 2.

Turning to FIG. 3, numeral 10B designates a further embodiment of a power unit system provided for supplying uninterruptible power in accordance to the present invention. It comprises a power unit system very similar to the embodiment described with reference to FIG. 2 and operates on an organic working fluid. However, in the embodiment described with reference to FIG. 3, motor/generator 52B is included such that when electric power is available at the electric grid motor/generator 52B operates as a motor for rotating turbine 57B. On the other hand, when no electric power is available on the electric grid, motor/generator 52B operates as an electric generator in order that the rotation of turbine 57B results in motor/generator 52B producing electric power that can be supplied to the load.

Figure 4:
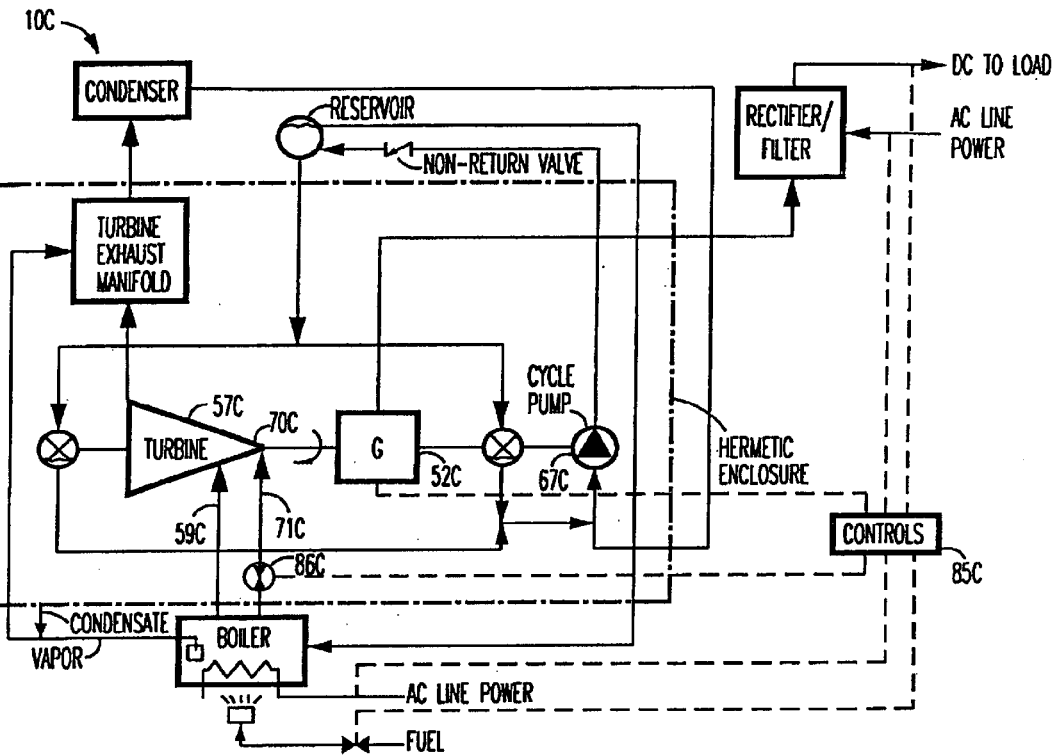
FIG. 4 is a schematic diagram of a further modification of the embodiment of the present invention shown in FIG. 2.

As far as FIG. 4 is concerned, numeral 10C designates an additional embodiment of the present invention wherein a power unit system is provided for supplying uninterruptible power in accordance to the present invention. Also here, this embodiment is similar to the embodiment described with reference to FIG. 1 and in particular to the embodiment described with reference to FIG. 2 and operates on an organic working fluid. In the present embodiment rather than using on-off valve 55A or 55B as shown in FIGS. 1 and 2 respectively, conduit 59C feeds one turbine nozzle out of several or tens present in nozzle block 70C so that a few percent of the organic working fluid vapors are fed to turbine 57C via conduit 59C for rotating it.

Consequently, when electric power is available at the electric grid, a small amount of organic working fluid vapor is supplied via conduit 59C and one nozzle of nozzle block 70C to turbine 57C for rotating the turbine. As a result, there is no need in this embodiment for an electric motor for rotating turbine 57C when electric power is available from the electric grid. In addition, when no electric power is available on the electric grid, control valve 86C that receives control signals from control unit 85C supplies organic working fluid vapor to the rest of the nozzles in nozzle block 70C for rotating turbine 57C at full power.

In these embodiments, if preferred, electric generator 73A in FIG. 2 can be a synchronous, homopolar, induction or permanent magnet generator, while motor 52A can be an induction, synchronous or permanent magnet motor.

Thus, in these embodiments, the use of organic Rankine cycle turbine 57, 57A, 57B and 57C rotating when the line power is available, eliminates the need for using a battery or batteries.

In addition, while the above description refers to the working fluid as an organic working fluid, the present includes water and its use in the Rankine cycle turbine system. In addition, of course, the water can be used as the working fluid in the Rankine cycle power plant systems that form part of the previously described embodiments.

Figure 5:
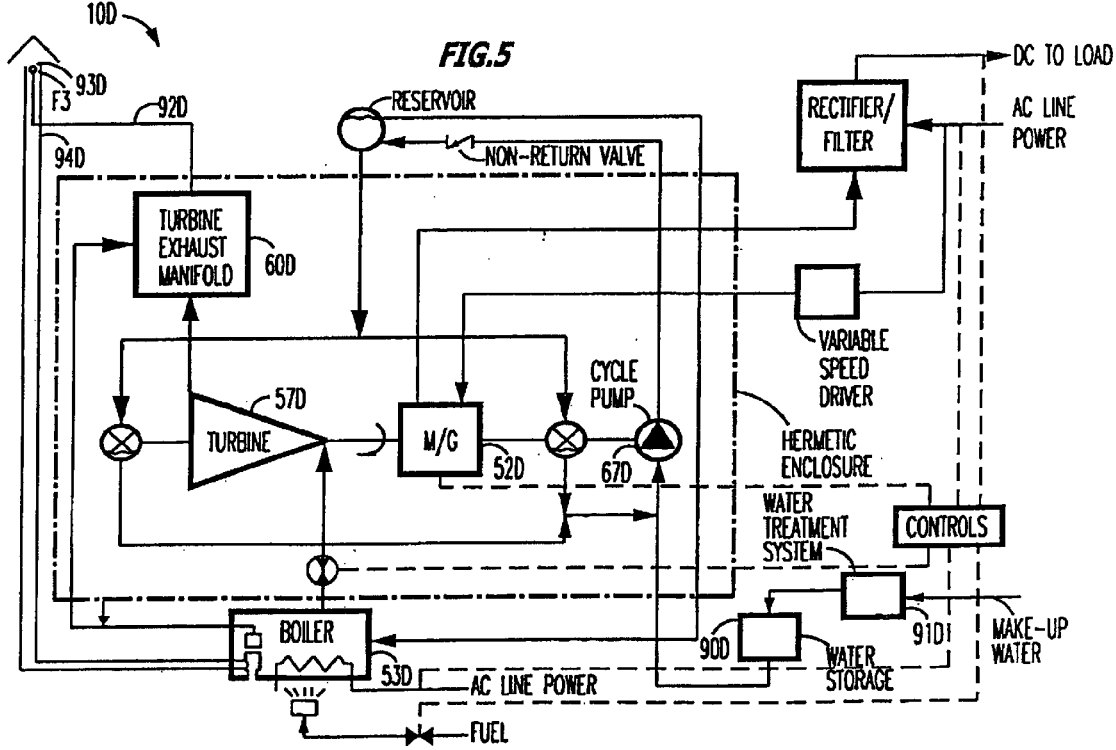
FIG. 5 is a schematic diagram of an additional embodiment of the present invention.

As far as FIG. 5 is concerned, numeral 10D designates an additional embodiment of the present invention for supplying uninterruptible power in accordance to the present invention. Basically, this embodiment is similar to previous described embodiments of the present invention, except that, in the present embodiment, the water working fluid is supplied from water storage tank 90D via pump 67D to boiler 53D. Water storage tank 90D itself is preferably supplied with treated water from water treatment system 91D furnished with make-up water. In addition, in this embodiment the low-pressure steam exiting turbine 57D, connected to high frequency asynchronous generator/motor 52D, is supplied from turbine exhaust manifold 60D via conduit 92D to stack or chimney 94D for exit to the atmosphere. Thus, turbine 57D has an atmospheric exhaust, and comprises consequently a back-pressure steam turbine. Furthermore, in an alternative according to the present invention, conduit or line 92D is preferably tapered at its outlet to stack 94D in order to assist the draft produced in the stack or chimney. In such a case, flap F3 can be connected externally to conduit or line 92D at its outlet 93D. In a further alternative, according to the present invention, portion of the exhaust steam exhausting turbine 57D present in conduit or line 92D can be mixed with treated water supplied to boiler 53D in order to directly preheat the water supplied to the boiler. In a still further alternative, according to the present invention, exhaust steam exhausting turbine 57D present in conduit or line 92D can be used to indirectly preheat the treated water supplied to boiler 53D. Condensate produced during such preheating can be supplied to water storage tank 90D.

Figure 6:
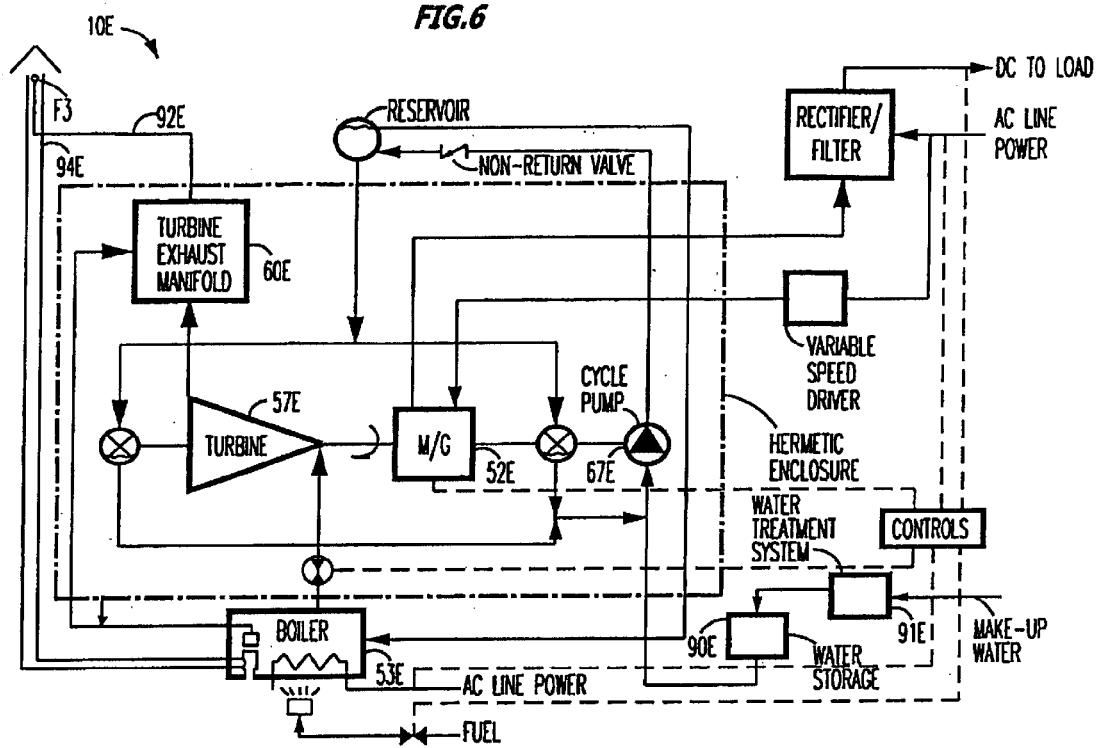
FIG. 6 is a schematic diagram of still another embodiment of the present invention.

Numeral 10E in FIG. 6 designates a still further embodiment of the present invention for supplying uninterruptible power in accordance to the present invention. Basically, this embodiment is also similar to the previous described embodiments of the present invention, and in particular to the embodiment, generator/motor 52E is a synchronous or a homopolar generator/motor.

Figure 7:
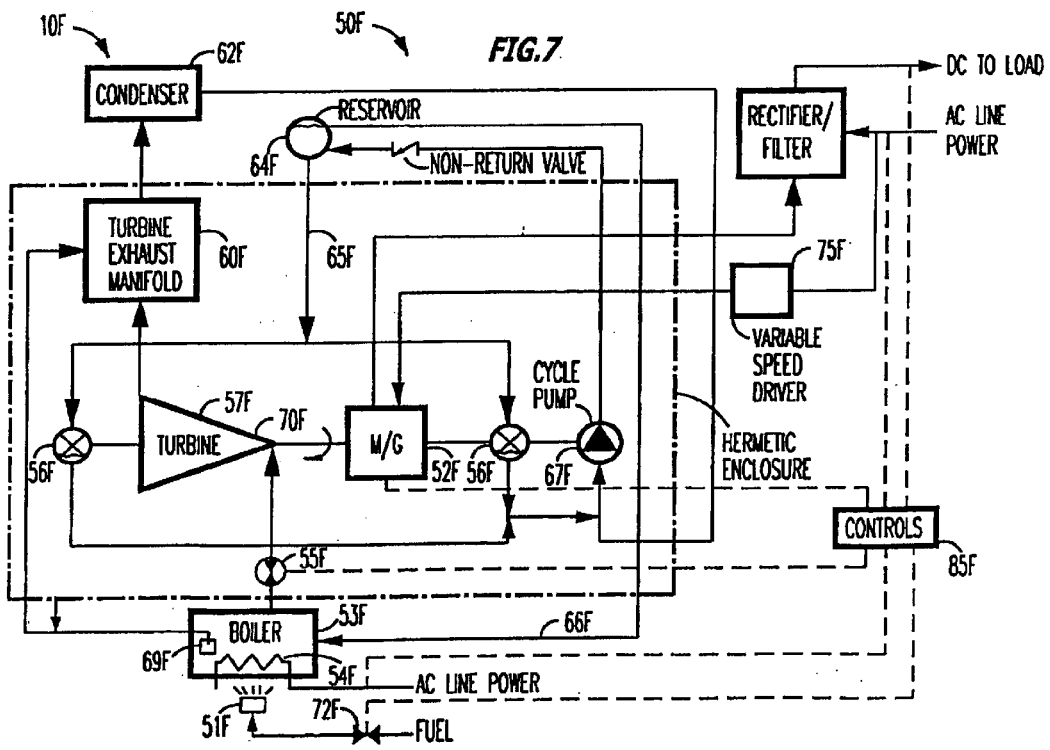
FIG. 7 is a schematic diagram of further embodiment of the present invention.

Turning now to FIG. 7, numeral 10F a still further embodiment of the present invention for supplying uninterruptible power in accordance to the present invention. Basically, this embodiment is similar to previous described embodiments of the present invention, except that, in the present embodiment, the working fluid, specifically water, is circulated in power unit 50F with the, aid of pump 67F. In this embodiment, the low-pressure steam exiting turbine 57F is supplied to turbine exhaust manifold 60F and then to condenser 62F, preferably an air-cooled condenser having a fan for supplying air to the condenser tubes, for producing steam condensate that is supplied using pump 67F to boiler 53F. In this embodiment, generator/motor 52F connected to turbine 57F can be a high frequency asynchronous generator/motor or alternatively a synchronous or a homopolar generator/motor.

In operation, when the electric grid or utility is supplying electric line power, electric motor/generator 52F operating as a motor rotates turbines 57F via driver 75F that receives power from the grid. Line 66F receives sufficient water vapor from boiler 53F, heated by electric heater 54F, for supplying fluid only to bearings 56F. Heater, i.e. burner, 51F is not operated and preferably a flap located on the stack of boiler 53F is maintained in a closed state by an actuator. Thus, liquid supplied via line 66A is supplied to reservoir 64F. This condensate is supplied via line 65A where it is cooled to bearings 56F. Condensate exiting the bearings is supplied via pump 67F, e.g. a pitot pump, to reservoir 64F from where it is returned to bearings 56F. Electric heater 54F continues to supply heat to water in boiler 53F for compensating for fluid finding its way back via line 68F to vessel 69F in heat relationship with boiler 53F. Thus, under such conditions, the electric grid supplies power to the load and the steam Rankine cycle turbine system is maintained at hot standby.

When the electric grid does not supply electric power, kinetic energy present in turbine 57F permits power unit 10F to continue to supply electric power even though no electric power is supplied to electric motor 52F from the electric grid or utility. Valve 55F is opened by control unit 85F, which senses the state of the line power, in order that water vapor is supplied from boiler 53F via conduit 71F to turbine nozzle block 70F. Consequently, power is now produced by the rotation of water Rankine cycle turbine 57F rotated by organic working fluid vapor produced by heat present in the hot water present in boiler 53F. At the same time, the actuator opens the flap and heater, i.e. burner, 51F, commences operation with the receipt of a control signal from control unit 85F that also sends a control signal to open fuel valve 72F. In addition, control unit 85A sends a control signal to electric heater 54F to stop operation. The rotation of water Rankine cycle turbine 57F results in motor/generator 52F, now operating as a generator, producing electric power that can be supplied to the load. Thus, now the heat produced by the combustion gases from the burner 51F heats the working fluid in boiler 53F that produces vapors for supply to turbine 57F.

When electric power becomes available from the electric grid once again, control 85F senses the electric power and sends control signals to heater, i.e. burner, 51F, to switch off, to the flap to close, to electric heater 54F to switch on and to close valve 55F so that no steam is supplied via this valve to water Rankine cycle turbine 57F. Liquid water continues to be supplied to bearings 56F of turbine 57F as previously described via line 66F, reservoir 64F and line 65F.

While the embodiment described with reference to FIGS. 5, 6 and 7 describe a generator/motor driven by turbine 57D, 57E and 57F, if preferred, a separate generator and motor, e.g. like motor 52A and generator 73A described with reference to FIG. 1, can be used instead of the generator/motor.

In addition, it should be pointed out that the present invention includes as well the method for operating the apparatus disclosed with reference to above-described figures.

Moreover, it should be pointed out that, at present, the embodiment of the present invention described with reference to FIG. 3 is considered the best mode for carrying out the present invention.

Furthermore, when an organic working fluid is used as the working fluid in the Rankine cycle turbine system or systems, the working fluid is preferably chosen from the group chlorobenzene—dichlorobenzene, trichlorobenzene; bicyclic aromatic hydrocarbons; substituted bicyclic aromatic hydrocarbons, heterocyclic aromatic hydrocarbons, substituted heterocyclic aromatic hydrocarbons, bicyclic or heterobicyclic compounds where one ring is aromatic and the other condensed ring is non-aromatic, and their mixtures such as naphthalene, 1-methyl-napthalene, 1-methyl-napthalene, tetralin, quinolene, benzothiophene; an organic, alkylated heat transfer liquid fluid or a synthetic alkylated aromatic heat transfer fluid, e.g. thermal oils such as Therminol LT fluid (an alkyl substituted aromatic fluid), Dowtherm J (a mixture of isomers of an alkylated aromatic fluid), isomers of diethyl benzene and mixtures of the isomers and butyl benzene.

Furthermore, while the above description refers to a hot standby mode of operation, the present invention is also operational in a warm standby mode wherein a battery is provided in addition to the Rankine cycle turbine system described above and detailed in the above-mentioned embodiments. In the warm standby mode, the battery provides power to the load after the line power has stopped supplying power to the load or the electric utility had failed and until the Rankine cycle turbine supplies the required power to the load. In this embodiment, the boiler is maintained warm (e.g. at about 60° C.) by e.g. an electric heater, like 54A shown in FIG. 2, described above so that the period of time needed for the Rankine cycle turbine to start supplying the required power level to the load is relatively short (e.g. up to a half hour). Thus, the battery used in this configuration is relatively small.

In addition, the units described in accordance with the present invention, can be used in a cold standby configuration, wherein a large battery is provided for supply power to the load when line power fails until nominal power is produced by the power unit. In such a system, the power until will commence operation when line power drops out.

Furthermore, in accordance with the present invention, the power produced by the generator of the Rankine cycle turbine unit, e.g. 73A of FIG. 2, etc., is preferably supplied to the load so that it threshold voltage is lower than that supplied to the load when line power is available. This permits the power produced by the Rankine cycle turbine unit to be supplied automatically to the load once the power from the grid or power utility had dropped below a certain predetermined threshold value. In the arrangement provided in accordance with the present invention, the need for using an additional or external rectifier can be saved. However, on the other hand, the line power can be supplied to the load via an additional or external rectifier.

In addition, in accordance with the present invention, it should be pointed out that operation of Rankine cycle turbine unit using Therminol or Dowtherm J permits the unit to operate at a relatively high temperature. When operating with these working fluids, low losses in particular during standby operation when grid or utility power is rotating the turbine are achieved. In addition, such high temperature operation can reduce the size of the condenser.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. An uninterruptible power supply associated with a power line supplying a load comprising:

a) a load circuit connecting said power line to said load for supplying power to the same while said power line is operative;

b) a rotatable member including a Rankine cycle turbine coupled to a device that operates as a motor when line power is applied to said device thereby rotating said member, and as a generator when line power is inoperative and said member is rotated by the application of vaporized working fluid to said turbine;

c) a driver circuit connecting said power line to said device thereby rotating said rotatable member at a standby rotational speed while said power line is operative for storing a predetermined amount of kinetic energy in the rotating member;

d) a boiler containing working fluid;

e) a burner associated with said boiler operable to produce vaporized working fluid and to maintain the same at an operational temperature level when said line power is inoperative;

f) a resistance heater associated with said boiler and connected to said line power for holding said working fluid at a standby temperature level while said power line is operative, said standby level of said boiler being greater than said operational level of said boiler whereby said working fluid contains a predetermined amount of thermal energy while said power line is operative;

g) a valve operable to connect said boiler to said turbine for applying vaporized working fluid to said turbine thereby rotating said rotatable member;

h) a control responsive to loss of line power (1) for operating said burner that causes said boiler to produce vaporized working fluid and for operating said valve that supplies vaporized working fluid to said Rankine cycle turbine which thereby rotates said member at a nominal operational speed that is less than said standby rotational speed, and (2) for connecting to said load whereby power is supplied to said load while said power line is inoperative, said thermal energy in said working fluid in said boiler and said predetermined amount of kinetic energy being converted by said device to power for said load upon loss of line power.

2. A power supply according to claim 1 in which said working fluid is an organic working fluid.

3. A power supply according to claim 2 in which said working fluid is a synthetic alkylated aromatic heat transfer fluid.

4. A power supply according to claim 1 wherein said member is mounted on bearings and said turbine exhausts heat-depleted working fluid while said valve is operated, and said power supply includes a condenser for condensing heat-depleted working fluid exhausted by said turbine and producing condensate, and conduits for returning said condensate to said boiler a portion of which is used to lubricate said bearings.

5. A power supply according to claim 4 wherein said boiler is constructed and arranged to produce a relatively small quantity of vaporized working fluid while said power line is operative, said power supply including an exhaust manifold interposed between said turbine and said condenser for passing heat-depleted working fluid to said condenser, and said power supply includes a conduit for supplying a relatively small quantity of vaporized working fluid to said exhaust manifold whereby condensate lubricants said bearings while said power line is operative.

6. A method for supplying uninterruptible power to a load connected to a power line, said method comprising:

a) connecting said power line to a rotatable member comprising a Rankine cycle turbine coupled to a device that operates as a motor when line power is applied to said device thereby rotating said member at a standby rotational speed for storing a predetermined amount of kinetic energy in said rotating member, and that operates as a generator when said line power is inoperative and said member is rotated by the application of vaporized working fluid to said turbine;

b) vaporizing working fluid and maintaining the same at an operational temperature level only when said line power is inoperable;

c) holding working fluid at a standby temperature level while said power line is operative, said standby temperature level being greater than said operational temperature level whereby said working fluid contains a predetermined amount of stored thermal energy while power line is operative;

d) applying said vaporized working fluid to said turbine thereby rotating said rotatable member in response to loss of line power whereby said turbine rotates said member at a nominal operational speed that is less than said standby rotational speed; and e) connecting said device to said load whereby power is supplied to said load while said power line is inoperative so that stored thermal energy in said working fluid and said predetermined amount of kinetic energy are converted to power for said load upon loss of line power.

* * * * *